US010308845B2

(12) United States Patent
Schuh et al.

(10) Patent No.: US 10,308,845 B2
(45) Date of Patent: Jun. 4, 2019

(54) ADHESIVE TAPE FEATURING ADHESIVE WITH CONTINUOUS POLYMER PHASE

(71) Applicant: TESA SE, Norderstedt (DE)

(72) Inventors: Christian Schuh, Hamburg (DE); Klaus Keite-Telgenbüscher, Hamburg (DE); Chris Gäbert, Weißenburg (DE); Minyoung Bai, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/138,414

(22) Filed: Apr. 26, 2016

(65) Prior Publication Data

US 2016/0326413 A1    Nov. 10, 2016

(30) Foreign Application Priority Data

May 5, 2015 (DE) .......... 10 2015 208 314
Sep. 17, 2015 (DE) .......... 10 2015 217 860

(51) Int. Cl.
| C09J 163/00 | (2006.01) |
| C09J 7/38 | (2018.01) |
| C09J 163/04 | (2006.01) |
| C08L 33/06 | (2006.01) |
| C08L 75/04 | (2006.01) |

(52) U.S. Cl.
CPC .......... *C09J 163/00* (2013.01); *C08L 33/06* (2013.01); *C08L 75/04* (2013.01); *C09J 7/38* (2018.01); *C09J 163/04* (2013.01)

(58) Field of Classification Search
None
See application file for complete search history.

(56) References Cited

U.S. PATENT DOCUMENTS

| 3,018,262 | A | | 1/1962 | Schroeder |
| 3,117,099 | A | | 1/1964 | Proops et al. |
| 3,729,313 | A | | 4/1973 | Smith |
| 3,741,769 | A | | 6/1973 | Smith |
| 3,928,288 | A | * | 12/1975 | Walker .......... C08G 59/08 525/504 |
| 4,058,401 | A | | 11/1977 | Crivello |
| 4,138,255 | A | | 2/1979 | Crivello |
| 4,231,951 | A | | 11/1980 | Smith et al. |
| 4,250,053 | A | | 2/1981 | Smith |
| 4,256,828 | A | | 3/1981 | Smith |
| 4,394,403 | A | | 7/1983 | Smith |
| 4,859,533 | A | | 8/1989 | Seiya et al. |
| 6,294,270 | B1 | | 9/2001 | Clough |
| 6,423,367 | B2 | | 7/2002 | Clough |
| 6,489,042 | B2 | | 12/2002 | Imken et al. |
| 6,908,722 | B2 | | 6/2005 | Ebata et al. |
| 7,429,419 | B2 | | 9/2008 | Ring et al. |
| 2005/0287363 | A1 | | 12/2005 | Ring et al. |
| 2005/0288437 | A1 | | 12/2005 | Ring et al. |
| 2009/0120576 | A1 | | 5/2009 | Ring et al. |
| 2010/0063221 | A1 | | 3/2010 | Manabe et al. |
| 2011/0301255 | A1 | | 12/2011 | Barriau et al. |
| 2012/0288659 | A1 | * | 11/2012 | Hoshi .......... C09J 133/20 428/41.8 |
| 2013/0072610 | A1 | * | 3/2013 | Sano .......... C08L 9/02 524/278 |
| 2015/0037559 | A1 | | 2/2015 | Dollase et al. |
| 2015/0037560 | A1 | | 2/2015 | Dollase et al. |
| 2016/0108287 | A1 | * | 4/2016 | Schumann .......... C09J 7/0217 156/327 |

FOREIGN PATENT DOCUMENTS

| DE | 10 2004 031 188 A1 | | 1/2006 |
| DE | 10 2008 053 520 A1 | | 5/2010 |
| DE | 10 2011 105 209 A1 | | 12/2012 |
| EP | 0 386 909 A2 | | 9/1990 |
| EP | 542 716 B1 | | 6/1997 |
| EP | 0 927 737 A1 | | 7/1999 |
| EP | 1026218 | * | 8/2000 |
| EP | 1 028 151 B1 | | 4/2002 |
| EP | 1612251 A1 | | 1/2006 |
| EP | 1819794 A1 | | 8/2007 |
| EP | 2 832 811 A1 | | 2/2015 |
| EP | 2832811 A1 | | 2/2015 |
| JP | 1991-282820 A | | 12/1991 |
| JP | 04189886 | * | 7/1992 |
| WO | 2009-09814 A2 | | 1/2009 |
| WO | WO-2014-202402 | * | 12/2014 |

* cited by examiner

*Primary Examiner* — David J Buttner
(74) *Attorney, Agent, or Firm* — Norris McLaughlin, P.A.

(57) ABSTRACT

An adhesive tape containing an adhesive comprising
at least one polymer
optionally a tackifier resin
at least one reactive resin, the adhesive comprising at least 104 parts of the at least one reactive resin per 100 parts of polymer and tackifier resin
at least one initiator and/or curing agent and/or accelerator
where the adhesive is a pressure sensitive adhesive, the at least one polymer being present as continuous polymer phase in the uncured state of the pressure sensitive adhesive.

19 Claims, 4 Drawing Sheets

ADHESIVE TAPE FEATURING ADHESIVE WITH CONTINUOUS POLYMER PHASE

This application claims foreign priority benefit under 35 U.S.C. § 119 of German Patent Application Nos. 10 2015 208 314.4, filed May 5, 2015 and 10 2015 217 860.9, filed Sep. 17, 2015, the disclosures of each of which are incorporated herein by reference.

The present invention relates to an adhesive tape containing an adhesive comprising at least one polymer and optionally at least one tackifier resin, at least one reactive resin, the adhesive comprising at least 104 parts of the at least one reactive resin per 100 parts of polymer and tackifier resin, at least one initiator and/or curing agent, to the use of such an adhesive tape, and to a method for producing the adhesive for an adhesive tape of this kind.

"At least 104 parts of the at least one reactive resin" should be understood in accordance with the invention to mean that either the (sole) reactive resin makes up 104 parts or more, or, where there are two or more reactive resins, the sum total of the fractions of the reactive resins makes up 104 or more.

BACKGROUND OF THE INVENTION

For the structural adhesive bonding of components, i.e. for bonding with very high (>10 MPa) peel adhesions, as in automotive engineering, for example, it is usual to use epoxide-based liquid adhesives. Under the complex control of metering machines, these adhesives are applied, and possess no initial bond strength, meaning that the components must be held in position over the curing period. There are a few systems which are obtained via inherently pressure-sensitively adhesive acrylates, but they lose their pressure-sensitive adhesiveness when the epoxide fraction goes beyond 50 wt %. Particularly high shear strengths, however, are obtained with very high epoxide fractions. A higher fraction of epoxide and hence a better peel adhesion are therefore always at the expense of the pressure-sensitive adhesiveness. Desirable adhesives are those which unite the positive qualities of a high epoxide fraction and high pressure-sensitive adhesiveness. For particularly simple application, in particular, adhesive tapes are preferred.

In the prior art there are a variety of approaches discernible to realizing a high epoxide fraction in conjunction with pressure-sensitive adhesiveness:

DE 10 2004 031 188 A1 discloses adhesives which consist at least of a) an acid-modified or acid anhydride-modified vinylaromatic block copolymer and b) an epoxide-containing compound. The chemical crosslinking of the resins with the elastomers produces very high strengths within the adhesive film. To increase the adhesion, the addition of tackifier resins compatible with the elastomer block of the block copolymers is also possible. The acid-modified and/or acid anhydride-modified elastomers and epoxy resins are used in a proportion such that the molar fraction of epoxide groups and anhydride groups is just equivalent. In this context, when the common elastomers with only low levels of modification are used, and when relatively low molecular mass epoxy resins having a low epoxide equivalent are employed, the amounts of epoxy resin used are only very small—below 10 wt %, based on the modified styrene block copolymer. In this way, essentially, the epoxy resin acts as a crosslinking agent for the modified elastomers.

U.S. Pat. Nos. 6,294,270 B, 6,423,367 B and 6,489,042 B describe crosslinkable mixtures of epoxidized vinylaromatic block copolymers and epoxy resins for purposes including their use as adhesives for the bonding of two electronic components. Described primarily is crosslinking through irradiation with UV light. For this purpose, here, a very high fraction of more than 90 wt % of the epoxidized vinylaromatic block copolymer has proved to be the best solution. Here again, essentially, the epoxy reisn is acting as a crosslinking agent for the modified elastomers. From these four abovementioned specifications it is apparent that there must in each case be a homogeneous blend of reactive resin and modified block copolymer, distinguished by high compatibility between these at least two components, so that even after crosslinking, the epoxy resin is present in molecularly dispersed form in the elastomer phase. Since the epoxy resin acts as crosslinking agent, there can be no formation of crosslinked epoxide phases. In their function as crosslinking agents, epoxides are used at not more than 10% in pressure-sensitive adhesive systems.

DE 10 2011 105 209 A1 describes a pressure-sensitively adhesive tape for structural adhesive bonds. In the prior art described therein it is expressly noted that there is no known pressure-sensitively adhesive system which on exposure to high temperature allows a structural bond free from creases and bubbles. Above all it is noted that bubble-free and channel-free products were not produced from solvent-based pressure sensitive adhesives. The problem was solved by way of a reactive thick-film polymer which as well as radically polymerizable acrylates contains 5-15% of solid bisphenol A epoxide and is crosslinked using UV light to such an extent as to obtain a slightly pressure-sensitively adhesive tape.

From this it is apparent that for pressure-sensitively adhesive systems, inherently pressure-sensitively adhesive acrylate-based elastomers are needed, and that these elastomers can be crosslinked with up to 15% of epoxide.

EP 1 028 151 B1 describes an acrylate-based pressure sensitive epoxide adhesive which on the one hand is made pressure-sensitively adhesive by maleic anhydride copolyacrylates, while on the other hand the epoxide fraction can be increased, surprisingly, to up to 50%. It is maintained there that after curing, the shear strength goes up with the amount of epoxide, but the pressure-sensitive adhesiveness is lost. Through the use of maleic anhydride copolyacrylates as tackifier resin, however, it is possible to achieve epoxide fractions of up to 50 wt %, although preference is given to using 20 to 40 wt %, and the examples use not more than 25 wt %.

EP 0 386 909 A1 describes a copolyacrylate-based prepolymer which is preparable by UV radiation, which is mixed with a latent curing agent and a phenolic epoxy resin, and which is polymerized further by UV radiation after having been coated on a substrate material in web form. The pressure sensitive adhesive is thermally postcrosslinkable, and the epoxy resin fractions and curing agent fractions present in the copolyacrylate matrix react with one another. Again, acrylates are also needed in order to produce epoxide adhesive tapes which are pressure-sensitively adhesive and thermally postcurable. While claims are made of up to 60 wt % epoxy resin, the inventive examples only realize <51 wt %.

Known additionally, from J. Appl. Polym. Sci. 41, 467, 1990, "Rubber-Modified Epoxides", is the addition of elastomers to epoxy resin adhesives. A common method for generating two-phase morphologies, for example in epoxy resin adhesives, is the addition of an endgroup-modified, epoxide-reactive polybutadiene-co-acrylonitrile copolymer to the uncured epoxy resin. In this case the thermoplastic polymer must be soluble in the uncured epoxy resin, but in the course of the curing reaction must be incompatible with the epoxy resin polymer, producing phase separation in the course of curing. When the gel point is reached, the process of phase separation is halted, and so the thermoplastic or elastomeric polymer is present in the form of microscopic spherical domains in the epoxy resin matrix. When elastomers are added to an epoxy resin, therefore, a disperse elastomer phase is formed in the epoxide matrix.

EP 0 927 737 A1 describes the addition of elastomer particles of high melting point (nylon, for example) and carboxy-terminated nitrile rubber in epoxy adhesives. It is shown that even in the cured tape, these particles are present as phase-separated particles with a size of ~3 μm in the epoxide matrix. According to this specification, the addition of elastomer particles and nitrile rubber is advantageous when they are present as a disperse phase after curing. Furthermore, solid bisphenol A epoxides produce lower crosslinking densities than their liquid derivatives. Such so-called "prepregs" ("preimpregnated fibres") are also "self-adhesive" and "tacky", but by definition such prepregs consist of woven fabrics impregnated with epoxide, which give the epoxy resin a certain cohesion.

Also known are sheetlike structures impregnated with liquid resin, such as prepregs, for example, for the production of circuit boards or components made from fibre composite plastics. These are sheetlike textile structures impregnated with a reactive resin. For establishing storability and transportability, the reactive resins are generally partially gelled, meaning that the curing reaction is initiated and then halted at an early stage (B-stage). Here there is a marked increase in viscosity of the resin, allowing the impregnated structure to be handled. Prepregs of this kind are pressure-sensitively adhesive and can therefore be laminated together at room temperature. Like adhesive tapes, they are generally lined with release liners in order to make them stackable or windable. A disadvantage of this prior art is that the partially gelled prepregs must be stored under cool conditions in order to prevent continuation of the curing reaction. Moreover, the increase in viscosity lessens the wetting capacity for the substrate surface on adhesive bonding. Prepregs impact-modified with polyurethane and with polyvinyl formal are described in JP 1991282820A and in U.S. Pat. No. 4,859,533, respectively.

Polyurethanes are used in epoxide mixtures, besides, in order to obtain a very low pressure-sensitive adhesiveness. This is described for example in DE 10 2008 053 520 A1. Even the crosslinked polyurethane composition described in WO 2009 09814 A1, with not more than 50 wt % of epoxide, results in an adhesive which is not pressure-sensitively adhesive.

To summarize: for structural adhesive bonds in the prior art, accordingly, almost exclusively liquid epoxide adhesives or urethane adhesives are used. They are usually blended with impact modifiers consisting of elastomers and/or thermoplastics, to form a disperse elastomer/thermoplastic phase. These systems are not pressure-sensitively adhesive.

Aside from prepregs, in which the woven fabrics provide the epoxy resin with a certain cohesion, the only pressure-sensitively adhesive systems described to date for structural bonds have been those based on acrylates with epoxides. The acrylates usually contain epoxide functionalities and so in the curing step the acrylate is cured via the epoxide crosslinkers. The shear strength rises with the epoxide fraction, but conversely this results in the pressure-sensitive adhesiveness falling off. A condition for the presence of pressure-sensitive adhesiveness is a certain cohesion. This is provided via the pressure-sensitively adhesive acrylates, and, when certain amounts of liquid epoxide are reached, it goes into sharp reverse. A key disadvantage in the present state of the art is the low epoxide content, restricting the shear strengths that can be achieved.

SUMMARY OF THE INVENTION

It was an object of the present invention, therefore, to provide a pressure-sensitively adhesive tape which, after bonding, can be cured to give a structural adhesive and which in comparison to the prior art exhibits significantly higher shear strengths after curing.

With an adhesive tape of the type specified at the outset, this object is achieved in accordance with the invention by the adhesive being a pressure sensitive adhesive, with the at least one polymer being present as continuous polymer phase in the uncured state of the pressure sensitive adhesive. "Uncured state" here means the state before the crosslinking reaction of the reactive resin is initiated.

DETAILED DESCRIPTION

Pressure sensitive adhesives here are adhesives which permit a durable bond to the substrate even under relatively weak applied pressure, and which after use can be detached from the substrate again substantially without residue. At room temperature, pressure sensitive adhesives have a permanently pressure-sensitively adhesive effect, thus exhibiting a sufficiently low viscosity and a high initial tack, so that they wet the surface of the respective substrate even on low applied pressure. The bondability of such adhesives derives from their adhesive properties, and the redetachability from their cohesive properties.

"Continuous polymer phase" means that the polymer is present as a continuous phase in which the reactive resin is present in solution and/or dispersion.

It has been found that in this way it is possible to realize pressure sensitive adhesives with up to 85 wt % reactive resin fraction. The pressure-sensitive adhesiveness is generated by the polymers surprisingly, in spite of the high epoxide fractions, forming a continuous phase which provides for the cohesion required for pressure-sensitive adhesiveness.

In the uncured state, the reactive resins are preferably present at least partly in homogeneous solution in the continuous phase. In this way a pressure-sensitively adhesive system is produced. In one particularly advantageous embodiment, the reactive resin is present fully in homogeneous solution in the polymer, and so in the cured state a continuous epoxide phase is formed, producing shear strengths comparable to those of the liquid epoxide adhesives.

"In homogeneous solution" here means that under a scanning electron microscope there are no different phases apparent between dissolved material and solvating material.

With particular preference the adhesive comprises at least 120 parts of reactive resin per 100 parts of polymer and optionally tackifier resin, preferably at least 200 parts of reactive resin, more particularly at least 300 parts of reactive resin. "Part" here is based on parts by weight. The wording "at least 120 parts of reactive resin per 100 parts of polymer" means that at least 120 g are used for 100 g of polymer. Where tackifier resin is also present, the parts of polymer and tackifier resin are combined. In this case, where more than one reactive resin is used, the figures are based on the sum of the parts by weight of the reactive resins; where more than one polymer is used, on the sum of the parts by weight of the polymers used, with the addition, where appropriate, of the amount of the tackifier resin or of the sum of the parts by weight of the tackifier resins used.

As reactive resin, there is preference given to using an epoxy resin. With epoxy resins, adhesives of particularly high shear strength can be produced. Moreover, the cross-linking reactions are readily initiated and managed. In the uncured state, the adhesives produced using epoxy resins are sufficiently storage-stable. Particularly preferred as reactive resin here is at least one epoxy resin based on bisphenol A, bisphenol S, bisphenol F, an epoxy novolak, an epoxy-cresol novolak or an epoxidized nitrile rubber.

The polymer may be one polymer, or else a mixture of two or more different polymers. This at least one polymer may more particularly be an elastomer or a thermoplastic.

Examples of polymers are elastomers of the kind customarily used in the pressure sensitive adhesives field, as are described for example in the "Handbook of Pressure Sensitive Adhesive Technology" by Donatas Satas (Satas & Associates, Warwick 1999).

These are, for example, elastomers based on acrylates and/or methacrylates, polyurethanes, natural rubbers, synthetic rubbers such as butyl, (iso)butyl, nitrile or butadiene rubbers, styrene block copolymers with an elastomer block composed of unsaturated or partly or fully hydrogenated polydiene blocks (polybutadiene, polyisoprene, poly(iso)butylenes, copolymers of these, and also further elastomer blocks familiar to the skilled person), polyolefins, fluoropolymers and/or silicones.

Where rubber or synthetic rubber or blends produced from them are used as base material for the adhesive, then the natural rubber may be selected in principle from all available grades such as, for example, crepe, RSS, ADS, TSR or CV products, depending on required level of purity and of viscosity, and the synthetic rubber or the synthetic rubbers may be selected from the group of the randomly copolymerized styrene-butadiene rubbers (SBR), the butadiene rubbers (BR), the synthetic polyisoprenes (IR), the butyl rubbers (IIR), the halogenated butyl rubbers (XIIR), the acrylate rubbers (ACM), the ethylene-vinyl acetate copolymers (EVA) or the polyurethanes and/or blends thereof.

As the at least one polymer it is also possible for any kind of thermoplastics known to the skilled person to be used, as are stated for example in the textbooks "Chemie and Physik der synthetischen Polymere" by J. M. G. Cowie (Vieweg, Braunschweig) and "Makromolekulare Chemie" by B. Tieke (VCH Weinheim, 1997). These are, for example, poly(ethylene), poly(propylene), poly(vinyl chloride), poly(styrene), poly(oxymethylenes), poly(ethylene oxide), poly(ethylene terephthalate), poly(carbonates), poly(phenylene oxides), poly(urethanes), poly(ureas), acrylonitrile-butadiene-styrene (ABS), poly(amides) (PA), poly(lactate) (PLA), poly(etheretherketone) (PEEK), poly(sulphone) (PSU), poly(ethersulphone) (PES). Poly(acrylates), poly(methacrylates) and poly(methyl methacrylates) (PMMA) are likewise possible as polymer, but are not preferred for the purposes of the present invention.

The selection of the polymer component is dependent on the epoxide system chosen. Where polar epoxides are used (frequently prepared by reaction of alcohols with epichlorohydrin, such as the reaction product of bisphenol A and epichlorohydrin, for example), more polar polymers are especially preferred. These include both elastomers such as acrylonitrile-butadiene rubbers and thermoplastics such as poly(ethylene oxide), poly(ethylene terephthalate), poly(carbonates), poly(phenylene oxides), poly(urethanes), poly(ureas), poly(amides) (PA), poly(lactate) (PLA), poly(etheretherketone) (PEEK), poly(sulphone) (PSU) and poly(ethersulphone) (PES).

For less polar epoxides such as dicyclopentadiene diepoxide, for example, less polar polymers are preferred. These are, for example, poly(styrene), styrene block copolymers with an elastomer block composed of unsaturated or partly or fully hydrogenated polydiene blocks (polybutadiene, polyisoprene, poly(iso)butylene, copolymers of these, and also further elastomer blocks familiar to the skilled person), or thermoplastic polyolefins, fluoropolymers and/or silicones.

In order to obtain pressure sensitive adhesives having particularly high epoxide contents, particularly suitable polymers are all those which are not intrinsically pressure-sensitively adhesive, and which in other words do not meet the Dahlquist criterion at room temperature (cf. J. Adhesion, 1991, vol. 34, pp. 189-200 or C. A. Dahlquist: Tack, adhesion, fundamentals and practice, McLaren and Sons Ltd., London, 1966). This applies both to the polymer component and to the mixture of polymer and tackifier resin, where such is used. Although, therefore, polymer and optionally tackifier resin per se are not pressure-sensitively adhesive, the resulting adhesive of the adhesive tapes of the invention is pressure-sensitively adhesive.

Particularly advantageous polymers for very high bond strengths are poly(amides), polyurethanes, acrylonitrile-butadiene rubbers and poly(ureas), poly(etheretherketone) (PEEK), poly(sulphone) (PSU) and poly(ethersulphone) (PES).

Where polyurethanes are employed, they have been found to be particularly advantageous for good peel adhesions in the uncured state if the polyurethane is semicrystalline and in the DSC measurement has a melting peak or crystallization peak which corresponds to an enthalpy of fusion of at least 5 J/g, preferably of 25 J/g and more preferably of 40 J/g.

The polymers of the polymer mixture may be of linear, branched, star-shaped or grafted structure, to give only a few examples, and may have a homopolymer, random copolymer, alternating copolymer or block copolymer construction. For the purposes of this invention, the designation "random copolymer" includes not only those copolymers in which the comonomers used in the polymerization are incorporated purely statistically, but also those in which there are gradients in the comonomer composition and/or local accumulations of individual comonomer varieties in the polymer chains. Individual polymer blocks may be constructed as a copolymer block (random or alternating).

In one particularly preferred embodiment, the polymer of the adhesive in the adhesive tape of the invention is chemically crosslinked after coating and before use. This improves the technical adhesive properties in the uncured state. This becomes particularly clear under shearing load with simultaneous temperature elevation in the test known as the SAFT test (shear adhesion failure temperature). The more cohesive the adhesive, the smaller the shear travel. Adhesives are characterized using short-term temperature stability (STTS), defined as the temperature at which the shear travel reaches 1000 μm.

Particularly suitable adhesive tapes in accordance with the invention are those for which the short-term temperature stability of the uncured adhesive tape is greater than 35° C., preferably 45° C., more particularly greater than 50° C.

The chemical crosslinking of the polymer preferably takes place under induction by radiation or via the addition of a crosslinking agent, where the crosslinking agent contains, in particular, at least 2 reactive groups selected from the group consisting of isocyanates, alkoxysilanes and alkyl halides, optionally with addition of a polyfunctional (i.e. f>1) alcohol or amine having a molar mass M<10 000 g/mol. The functionality f here denotes the average number of functional groups per molecule.

Tackifier resins can be used for the present invention, but a tackifier resin is not vital to the adhesives of the present invention. The desired pressure-sensitive adhesiveness of the adhesive is achieved even without addition of tackifier resin.

Where tackifier resins are employed, suitable tackifier resins are those as known to the skilled person from Satas, for example. The pressure sensitive adhesive here may comprise at least one variety of a preferably at least partly hydrogenated tackifier resin, examples being those which are compatible with the elastomer component or, where a copolymer composed of hard blocks and soft blocks is used, are compatible primarily with the soft block (plasticizer resins).

A corresponding tackifier resin may have a softening temperature, measured by the ring & ball method, of more than 25° C., and also, as a supplement, at least one variety of tackifier resin having a softening temperature of less than 20° C. By this means it is possible if necessary to fine-tune the technical adhesive performance, but also the performance of flow on the bonding substrate.

For relatively apolar elastomers, resins which can be used in the pressure sensitive adhesive are partially or fully hydrogenated resins based on rosin and rosin derivatives, hydrogenated polymers of dicyclopentadiene, partially, selectively or fully hydrogenated hydrocarbon resins based on $C_5$, $C_5/C_9$ or $C_9$ monomer streams, polyterpene resins based on α-pinene and/or β-pinene and/or δ-limonene and/or $\Delta^3$-carene, hydrogenated polymers of preferably pure $C_8$ and $C_9$ aromatics. Aforesaid tackifier resins may be used either alone or in a mixture.

It is possible here to employ both room-temperature-solid resins and liquid resins. In order to ensure high ageing stability and UV stability, hydrogenated resins having a degree of hydrogenation of at least 90%, preferably of at least 95%, are preferred.

As reactive resins, also referred to as crosslinkable components, it is possible in principle to use all reactive constituents which are known to the skilled person in the field of pressure sensitive adhesives or reactive adhesives and which form crosslinking macromolecules in a synthesis reaction, such constituents being as described for example in Gerd Habenicht: Kleben-Grundlagen, Technologien, Anwendungen, 6$^{th}$ edition, Springer, 2009. These by way of example are epoxides, polyesters, polyethers, polyurethanes, phenolic resin, cresol or novolak based polymers, polysulphides or acrylic polymers (acrylic, methacrylic).

The construction and the chemical nature of the crosslinkable component are not critical, provided that the synthesis reaction can be carried out under conditions—especially with regard to the temperatures employed, nature of the catalysts used and the like—that do not lead to any substantial adverse effect and/or decomposition of the polymer phase, it being preferably at least partly miscible with the elastomer phase.

Preferably at least one of the at least one reactive resin is a solid having a softening temperature of at least 45° C. or has a viscosity at 25° C. of at least 20 Pa s, preferably 50 Pa s, more particularly at least 150 Pa s.

Epoxide-containing materials or epoxy resins which are useful in the compositions of the invention are any organic compounds having at least one oxirane ring that are polymerizable by a ring-opening reaction. Such materials, referred to generally as epoxides, include both monomeric and polymeric epoxides and may be aliphatic, cycloaliphatic or aromatic. These materials generally have on average at least two epoxide groups per molecule, preferably more than two epoxide groups per molecule. The "average" number of epoxide groups per molecule is defined as the number of epoxide groups in the epoxide-containing material divided by the total number of epoxide molecules present. The polymeric epoxides include linear polymers having terminal epoxide groups (e.g. a diglycidyl ether of a polyoxyalkylene glycol), polymers having skeletal oxirane units (e.g. polybutadiene-polyepoxide) and polymers having epoxide side groups (e.g. a glycidyl methacrylate polymer or copolymer). The molecular weight of the epoxide-containing material may vary from 58 to about 100 000 g/mol or more. Mixtures of different epoxide-containing materials may also be used in the hotmelt compositions of the invention. Useful epoxide-containing materials include those which comprise cyclohexene oxide groups, such as the epoxycyclohexanecarboxylates, exemplified by 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate. For a more detailed list of useful epoxides of this kind, reference may be made to U.S. Pat. No. 3,117,099.

Further epoxide-containing materials which are particularly useful in the application of this invention include glycidyl ether monomers. Examples are the glycidyl ethers of polyhydric phenols which are obtained by reaction of a polyhydric phenol with an excess of chlorohydrins, such as epichlorohydrin (e.g. the diglycidyl ether of 2,2-bis(2,3-epoxypropoxyphenol)propane). Further examples of epoxides of this type which may be used in the application of this invention are described in U.S. Pat. No. 3,018,262 A.

There are a host of commercially available epoxide-containing materials which can be used in this invention. In particular, epoxides which are readily obtainable include octadecylene oxide, epichlorohydrin, styrene oxide, vinylcyclohexene oxide, glycidol, glycidyl methacrylate, diglycidyl ethers of bisphenol A (e.g. those obtainable under the trade designations EPON 828, EPON 1004 and EPON 1001F from Shell Chemical Co. and DER-332 and DER-334 from Dow Chemical Co.), diglycidyl ethers of bisphenol F (e.g. ARALDITE GY281 from Ciba-Geigy), vinylcyclohexene dioxide (e.g. ERL 4206 from Union Carbide Corp.), 3,4-epoxycyclohexylmethyl 3,4-epoxycyclohexenecarboxylate (e.g. ERL-4221 from Union Carbide Corp.), 2-(3,4-epoxycyclohexyl-5,5-spiro-3,4-epoxy)cyclohexane-metadioxane (e.g. ERL-4234 from Union Carbide Corp.), bis(3,4-epoxycyclohexyl) adipate (e.g. ERL-4299 from Union Carbide Corp.), dipentene dioxide (e.g. ERL-4269 from Union Carbide Corp.), epoxidized polybutadiene (e.g. OXIRON 2001 from FMC Corp.), silicone resin-containing epoxide functionality, epoxysilanes (e.g. beta(3,4-epoxycyclohexyl)ethyltrimethoxysilane and gamma-glycidoxypropyl-trimethoxysilane, available commercially from Union Carbide), flame retardant epoxy resins (e.g. DER-542, a brominated bisphenol-type epoxy resin available from Dow Chemical Co.), 1,4-butanediol diglycidyl ether (e.g. ARALDITE RD-2 from Ciba-Geigy), hydrogenated epoxy resins based on bisphenol A epichlorohydrin (e.g. EPONEX 1510 from Shell Chemical Co.), and polyglycidyl ethers of phenol-formaldehyde novolak (e.g. DEN-431 and DEN-438 from Dow Chemical Co.).

The adhesive of the adhesive tape of the invention may further comprise an accelerator as well. The effect of this accelerator is to lower the starting temperature for the crosslinking reaction of the reactive resin. The management on adhesive bonding is improved as a result. It should be borne in mind here that the starting temperature lowered through the addition of an accelerator goes hand in hand, as a disadvantage, with a reduced storage stability, since the lowering of the starting temperature also has the effect of unwanted increased reaction during storage. Nevertheless, the storage stability of the adhesive tapes of the invention is far superior to that of the prior-art prepregs impregnated with epoxide adhesives.

As accelerators it is possible in particular for modified and unmodified imidazoles, urea derivatives, acid anhydrides, tertiary amines, polyamines and a combination thereof to be employed, as available for example from Alzchem (Dyhard series), Huntsman (Aradur series) or Threebond.

The adhesive of the adhesive tape of the invention comprises at least one curing agent or initiator.

Curing agents are, for example, aliphatic amines, aromatic amines, modified amines, polyamide resins, acid anhydrides, secondary amines, mercaptans, especially polymercaptans, polysulphides, dicyandiamide, organic acid hydrazides.

Initiators for initiating a ring-opening polymerization of epoxides are, for example, imidazoles, boron trifluoride-amine complexes, tertiary amines, amine-blocked and/or ammonium-blocked thermal acid donors such as tetrabutylammonium triflate, ammonium triflate, amine-blocked dodecylbenzylsulphonic acid, and lanthanide triflates such as ytterbium(III), samarium(III), cerium(III), erbium(III), lanthanum(III) and dysprosium(III) trifluoromethanesulphonate.

Among the initiators for a cationic UV-induced curing it is possible in particular to use sulphonium, iodonium and metallocene based systems. For examples of sulphonium based cations, reference may be made to the details in U.S. Pat. No. 6,908,722 B1 (especially columns 10 to 21).

Examples of anions which serve as counterions to the cations identified above include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis-(pentafluoromethylphenyl)borate, bi(trifluoromethylsulphonyl)amides and tris(trifluoromethylsulphonyl)methides. Further conceivable, especially for iodonium-based iniators, are also chloride, bromide or iodide anions, although preference is given to initiators which are substantially free from chlorine and bromine.

More specifically, the useful systems include:
sulphonium salts (see, for example, U.S. Pat. Nos. 4,231, 951 A, 4,256,828 A, 4,058,401 A, 4,138,255 A and US 2010/063221 A1) such as triphenylsulphonium hexafluoroarsenate, triphenylsulphonium hexafluoroborate, triphenylsulphonium tetrafluoroborate, triphenylsulphonium tetrakis(pentafluorobenzyl)borate, methyldiphenylsulphonium tetrafluoroborate, methyldiphenylsulphonium tetrakis(pentafluorobenzyl)borate, dimethylphenylsulphonium hexafluorophosphate, triphenylsulphonium hexafluoroantimonate, diphenylnaphthylsulphonium hexafluoroarsenate, tritolylsulphonium hexafluorophosphate, anisyldiphenylsulphonium hexafluoroantimonate, 4-butoxyphenyldiphenylsulphonium tetrafluoroborate, 4-chlorophenyldiphenylsulphonium hexafluoroantimonate, tris(4-phenoxyphenyl)-sulphonium hexafluorophosphate, di(4-ethoxyphenyl)methylsulphonium hexafluoroarsenate, 4-acetylphenyldiphenylsulphonium tetrafluoroborate, 4-acetylphenyldiphenylsulphonium tetrakis(pentafluorobenzyl)borate, tris(4-thiomethoxyphenyl)sulphonium hexafluorophosphate, di(methoxysulphonylphenyl)-methylsulphonium hexafluoroantimonate, di(methoxynaphthyl)methylsulphonium tetrafluoroborate, di(methoxynaphthyl)methylsulphonium tetrakis (pentafluorobenzyl)-borate, di(carbomethoxyphenyl)methylsulphonium hexafluorophosphate, (4-octyloxyphenyl)diphenylsulphonium tetrakis(3,5-bis(trifluoromethyl)phenyl)borate, tris[4-(4-acetylphenyl)thiophenyl]sulphonium tetrakis(pentafluorophenyl)borate, tris(dodecylphenyl)sulphonium tetrakis(3,5-bis(trifluoromethyl)phenyl)borate, 4-acetamidophenyldiphenylsulphonium tetrafluoroborate, 4-acetamidophenyldiphenylsulphonium tetrakis (pentafluorobenzyl)borate, dimethyl-naphthylsulphonium hexafluorophosphate, trifluoromethyldiphenylsulphonium tetrafluoroborate, trifluoromethyldiphenylsulphonium tetrakis(pentafluorobenzyl)borate, phenylmethyl-benzylsulphonium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 10-phenyl-9-oxothioxanthenium tetrakis(pentafluorobenzyl)borate, 5-methyl-10-oxothianthrenium tetrafluoroborate, 5-methyl-10-oxothianthrenium tetrakis(pentafluorobenzyl)borate and 5-methyl-10,10-dioxothianthrenium hexafluorophosphate, iodonium salts (see, for example, U.S. Pat. Nos. 3,729, 313 A, 3,741,769 A, 4,250,053 A, 4,394,403 A and US 2010/063221 A1) such as diphenyliodonium tetrafluoroborate, di(4-methylphenyl)iodonium tetrafluoroborate, phenyl-4-methylphenyliodonium tetrafluoroborate, di(4-chlorophenyl)iodonium hexafluorophosphate, dinaphthyliodonium tetrafluoroborate, di(4-trifluoromethylphenyhiodonium tetrafluoroborate, diphenyliodonium hexafluorophosphate, di(4-methylphenyl)iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, diphenyliodonium hexafluoroantimonate, 2,2'-diphenyliodonium tetrafluoroborate, di(2,4-dichlorophenyl)iodonium hexafluorophosphate, di(4-bromophenyl)iodonium hexafluorophosphate, di(4-methoxyphenyl)-iodonium hexafluorophosphate, di(3-carboxyphenyl)iodonium hexafluorophosphate, di(3-methoxycarbonylphenyl)iodonium
hexafluorophosphate, di(3-methoxysulphonyl-phenyl) iodonium hexafluorophosphate, di(4-acetamidophenyl) iodonium hexafluorophosphate, di(2-benzothienyl)iodonium hexafluorophosphate, diaryliodonium tristrifluoromethylsulphonylmethide such as diphenyliodonium hexafluoroantimonate, diaryliodonium tetrakis(pentafluorophenyl)borate such as diphenyliodonium tetrakis-(pentafluorophenyl)borate, (4-n-desiloxyphenyl)phenyliodonium hexafluoroantimonate, [4-(2-hydroxy-n-tetradesiloxy)

phenyl]phenyliodonium hexafluoroantimonate, [4-(2-hydroxy-n-tetradesiloxy)phenyl]phenyliodonium trifluorosulphonate, [4-(2-hydroxy-n-tetradesiloxy)phenyl]phenyliodonium hexafluorophosphate, [4-(2-hydroxy-n-tetradesiloxy)phenyl]phenyliodonium tetrakis(pentafluorophenyl)borate, bis(4-tert-butylphenyl)iodonium hexafluoroantimonate, bis(4-tert-butylphenyl)iodonium hexafluorophosphate, bis(4-tert-butylphenyl)iodonium trifluorosulphonate, bis(4-tert-butyl-phenyl)iodonium tetrafluoroborate, bis(dodecylphenyl)iodonium hexafluoroantimonate, bis(dodecylphenyl)iodonium tetrafluoroborate, bis(dodecylphenyl)iodonium hexafluorophosphate, bis(dodecylphenyl)iodonium trifluoromethylsulphonate, di(dodecyl-phenyl)iodonium hexafluoroantimonate, di(dodecylphenyl)iodonium triflate, diphenyliodonium bisulphate, 4,4'-dichlorodiphenyliodonium bisulphate, 4,4'-dibromo-diphenyliodonium bisulphate, 3,3'-dinitrodiphenyliodonium bisulphate, 4,4'-dimethyl-diphenyliodonium bisulphate, 4,4'-bis(succinimidodiphenyl) iodonium bisulphate, 3-nitrodiphenyliodonium bisulphate, 4,4'-dimethoxydiphenyliodonium bisulphate, bis(dodecylphenyl)iodonium tetrakis(pentafluorophenyl)borate, (4-octyloxyphenyl)-phenyliodonium tetrakis(3,5-bis-trifluoromethylphenyl)borate and (tolylcumyl)iodonium tetrakis(pentafluorophenyl)borate, and ferrocenium salts (see, for example, EP 542 716 B1) such as $\eta_5$-(2,4-cyclopentadien-1-yl)-[(1,2,3,4,5,6,9)-(1-methylethyl)benzene]iron.

Examples of commercialized photoinitiators are Cyracure UVI-6990, Cyracure UVI-6992, Cyracure UVI-6974 and Cyracure UVI-6976 from Union Carbide, Optomer SP-55, Optomer SP-150, Optomer SP-151, Optomer SP-170 and Optomer SP-172 from Adeka, San-Aid SI-45L, San-Aid SI-60L, San-Aid SI-80L, San-Aid SI-100L, San-Aid SI-110L, San-Aid SI-150L and San-Aid SI-180L from Sanshin Chemical, SarCat CD-1010, SarCat CD-1011 and SarCat CD-1012 from Sartomer, Degacure K185 from Degussa, Rhodorsil Photoinitiator 2074 from Rhodia, CI-2481, CI-2624, CI-2639, CI-2064, CI-2734, CI-2855, CI-2823 and CI-2758 from Nippon Soda, Omnicat 320, Omnicat 430, Omnicat 432, Omnicat 440, Omnicat 445, Omnicat 550, Omnicat 550 BL and Omnicat 650 from IGM Resins, Daicat II from Daicel, UVAC 1591 from Daicel-Cytec, FFC 509 from 3M, BBI-102, BBI-103, BBI-105, BBI-106, BBI-109, BBI-110, BBI-201, BBI, 301, BI-105, DPI-105, DPI-106, DPI-109, DPI-201, DTS-102, DTS-103, DTS-105, NDS-103, NDS-105, NDS-155, NDS-159, NDS-165, TPS-102, TPS-103, TPS-105, TPS-106, TPS-109, TPS-1000, MDS-103, MDS-105, MDS-109, MDS-205, MPI-103, MPI-105, MPI-106, MPI-109, DS-100, DS-101, MBZ-101, MBZ-201, MBZ-301, NAI-100, NAI-101, NAI-105, NAI-106, NAI-109, NAI-1002, NAI-1003, NAI-1004, NB-101, NB-201, NDI-101, NDI-105, NDI-106, NDI-109, PAI-01, PAI-101, PAI-106, PAI-1001, PI-105, PI-106, PI-109, PYR-100, SI-101, SI-105, SI-106 and SI-109 from Midori Kagaku, Kayacure PCI-204, Kayacure PCI-205, Kayacure PCI-615, Kayacure PCI-625, Kayarad 220 and Kayarad 620, PCI-061T, PCI-062T, PCI-020T, PCI-022T from Nippon Kayaku, TS-01 and TS-91 from Sanwa Chemical, Deuteron UV 1240 from Deuteron, Tego Photocompound 1465N from Evonik, UV 9380 C-D1 from GE Bayer Silicones, FX 512 from Cytec, Silicolease UV Cata 211 from Bluestar Silicones and Irgacure 250, Irgacure 261, Irgacure 270, Irgacure PAG 103, Irgacure PAG 121, Irgacure PAG 203, Irgacure PAG 290, Irgacure CGI 725, Irgacure CGI 1380, Irgacure CGI 1907 and Irgacure GSID 26-1 from BASF.

The skilled person is aware of further systems which can likewise be used in accordance with the invention. Photoinitiators are used uncombined or as a combination of two or more photoinitiators.

The adhesive may optionally comprise further additives, rheology modifiers, foaming agents, fillers or adhesion promoters.

Further additives which may typically be utilized are as follows:

plasticizing agents such as, for example, plasticizer oils, or low molecular mass liquid polymers, such as low molecular mass polybutenes, for example, preferably with a fraction of 0.2 to 5 wt %, based on the total weight of the pressure sensitive adhesive primary antioxidants such as, for example, sterically hindered phenols, preferably with a fraction of 0.2 to 1 wt %, based on the total weight of the pressure sensitive adhesive secondary antioxidants, such as, for example, phosphites or thioethers, preferably with a fraction of 0.2 to 1 wt %, based on the total weight of the pressure sensitive adhesive process stabilizers such as, for example, C radical scavengers, preferably with a fraction of 0.2 to 1 wt %, based on the total weight of the pressure sensitive adhesive light stabilizers such as, for example, UV absorbers or sterically hindered amines, preferably with a fraction of 0.2 to 1 wt %, based on the total weight of the pressure sensitive adhesive processing aids, preferably with a fraction of 0.2 to 1 wt %, based on the total weight of the pressure sensitive adhesive end-block reinforcer resins, preferably with a fraction of 0.2 to 10 wt %, based on the total weight of the pressure sensitive adhesive, and optionally further polymers preferably elastomeric in nature; elastomers utilizable accordingly include, among others, those based on pure hydrocarbons, for example unsaturated polydienes such as natural or synthetically produced polyisoprene or polybutadiene, chemically essentially saturated ethylene-propylene copolymers, α-olefin copolymers, polyisobutylene, butyl rubber, ethylene-propylene rubber, and also chemically functionalized hydrocarbons such as, for example, halogen-containing, acrylate-containing, or allyl- or vinyl ether-containing polyolefins, preferably with a fraction of 0.2 to 10 wt %, based on the total weight of the pressure sensitive adhesive.

The pressure sensitive adhesive of the invention is foamed. Foaming may take place by means of any desired chemical and/or physical methods. Preferably, however, a foamed pressure sensitive adhesive of the invention is obtained by the introduction and subsequent expansion of microballoons.

An adhesive tape of the invention is especially suitable when the peel adhesion of the uncured adhesive on steel is at least 1 N/cm. With this, good pressure-sensitively adhesive properties are given.

Furthermore, an adhesive tape of the invention is particularly advantageous when the bond strength of the cured adhesive tape, measured by dynamic shear test on steel, is at least 5 MPa, preferably 10 MPa, more particularly greater than 15 MPa. Bond strengths at such levels ensure a very stable and durable bond between the substrates to be bonded, and are also suitable, for example, for bonds in the automotive industry for which the bond strength requirements are exacting.

The general expression "adhesive tape" embraces a carrier material which is provided on one or both sides with a (pressure sensitive) adhesive. The carrier material encompasses all sheetlike structures, examples being two-dimensionally extended sheets or sheet sections, tapes with extended length and limited width, tape sections, diecuts (in the form, for example, of contours or borders of an (opto) electronic arrangement), multi-layer arrangements and the like. For different applications, any of a very wide variety of carriers can be combined with the adhesives, examples being sheets, woven fabrics, nonwovens, and papers. Furthermore, the expression "adhesive tape" also includes what are called "adhesive transfer tapes", in other words an adhesive tape without carrier. In the case of an adhesive transfer tape, the adhesive is instead applied, prior to application, between flexible liners, which are provided with a release layer and/or have anti-adhesive properties. For the actual application, generally, first of all one line is removed, the adhesive is applied, and then the second line is removed. In this way the adhesive can be used directly to join two surfaces. Carrierless adhesive transfer tapes of these kinds are particularly preferred in accordance with the invention. Using a pressure-sensitively adhesive carrierless adhesive transfer tape of the invention of this kind, an adhesive bond is made possible which is very precise in terms of positioning and metering.

Also possible are adhesive tapes which operate not with two liners but instead with a single liner furnished for double-sided release. In that case the web of adhesive tape is lined on its facing side with one side of a double-sidedly releasing liner, and its bottom side is lined with the reverse face of the double-sidedly releasing liner, in particular by an adjacent turn, on a bale or a roll.

Carrier material presently used with preference for an adhesive tape comprises polymer films, film composites, or films or film composites provided with organic and/or inorganic layers. Films/film composites of this kind may consist of all commonplace plastics used for film production; as examples, though without restriction, the following may be mentioned:

polyethylene, polypropylene—especially the oriented polypropylene (OPP) produced by monoaxial or biaxial stretching, cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulphone (PES) or polyimide (PI).

In one particularly preferred embodiment the carrier film is selected such that its melting point is below the curing temperature. In this way the film in the uncured state provides additional cohesion, but dissolves at least partly in the crosslinking step, and so a continuous epoxide network is built up and accordingly high bond strengths are achieved.

The thickness of the pressure sensitive adhesive, present either in the form of an adhesive transfer tape or as a coating on a sheetlike structure, is preferably between 1 µm and 2000 µm, more preferably between 5 µm and 1000 µm and very preferably between about 50 µm and 550 µm.

Layer thicknesses between 300 µm and 700 µm are required for the bridging of tolerances in the automotive industry, for example.

A further possibility for the bridging of tolerances lies in the foaming of the product. This may occur at the delivery stage itself or on application. For this purpose it is possible to use all foaming media and foaming methods that are known to the skilled person.

Layer thicknesses between 1 µm and 50 µm reduce the usage of material. However, there is a reduction in the adhesion on the substrate.

The invention further relates to the use of the adhesive tape of the invention for the permanent joining of two substrates. In view of the high bond strength which is achievable, the adhesive tape can be put to multivarious uses. One important area of application is the automotive industry. There, many parts are bonded to one another that are required to withstand high loads. The present invention further relates to the adhesive bonding of oiled substrates. On substrates of this kind as well, the adhesive tape of the invention can be employed, and permits stable bonding. Oiled substrates are in diverse use within the automotive industry, since the metal parts used are regularly extensively oiled for reasons of rust prevention.

Lastly the present invention relates to a method for producing a solvent-based pressure sensitive adhesive, more particularly for an adhesive tape of the invention, comprising the steps of dissolving the at least one polymer in a suitable solvent, preferably at elevated temperature;

adding the at least one reactive resin;

cooling to room temperature;

adding the curing agent and optionally the accelerator with strong shearing, in order to achieve effective dispersing;

adding optional additives, rheology modifiers, foaming agents, fillers, adhesion promoters.

With a method of this kind it is possible to produce solvent-based pressure sensitive adhesives for the adhesive tapes of the invention with particular simplicity and reliability. The shearing in this case is preferably produced by stirring.

The present invention further relates to a method for producing a solvent-free pressure sensitive adhesive, more particularly for an adhesive tape of the invention, comprising the steps of melting the at least one polymer in particular in an extruder;

metering in the at least one reactive resin;

cooling the melt to below 100° C., more particularly below 80° C.;

metering in and mixing in the curing agent and optionally the accelerator;

extruding thin layers with a thickness of 50 µm to 3000 µm, in particular by means of nozzle or of calender rolls.

Through the use of the temperature profile described, the pressure sensitive adhesive can be produced without solvent. The high temperatures at the start allow the polymer and reactive resin to be initially mixed. Then there is a lowering in the temperature, and only after that is the curing agent added, and consequently said agent does not react; instead, the composition can be extruded without problems. This method allows a particularly high flexibility in the layer thicknesses which can be achieved. Even particularly thick layers can be produced with this method.

Examples

Measurement Methods

Molecular Weight:

The molecular weight determinations for the number-average molecular weights $M_n$ and the weight-average molecular weights $M_w$ were made by gel permeation chromatography (GPC). The eluent used was THF (tetrahydrofuran) with 0.1 vol % trifluoroacetic acid. Measurement took place at 25° C. The pre-column used was a PSS-SDV, 5μ, $10^3$ Å, ID 8.0 mm×50 mm. Separation took place using the columns PSS-SDV, 5μ, $10^3$ and also $10^5$ and $10^6$ Å each with ID 8.0 mm×300 mm. The sample concentration was 4 g/l, the flow rate 1.0 ml per minute. Measurement took place against polystyrene standards.

Enthalpy of Fusion:

The softening temperature of copolymers, hard and soft blocks and uncured reactive resins is determined calorimetrically by way of Differential Scanning calorimetry (DSC) in accordance with DIN 53765:1994-03. Heating curves run with a heating rate of 10 K/min. The specimens are measured in Al crucibles with a perforated lid under a nitrogen atmosphere. The heating curve evaluated is the second curve. In the case of amorphous substances, glass transition temperatures occur, in the case of (semi)crystalline substances the temperatures are melting temperatures. A glass transition can be seen as a step in the thermogram. The glass transition temperature is evaluated as the middle point of this step. A melting temperature can be recognized as a peak in the thermogram. The melting temperature recorded is the temperature at which maximum heat change occurs. From the melting peak, the enthalpy of fusion in J/g is obtained.

Ring & Ball Softening Temperature:

The tackifier resin softening temperature is measured by the relevant methodology, which is known as Ring and Ball and is standardized according to ASTM E28.

The tackifier resin softening temperature of the resins is determined using an automatic Ring & Ball tester HRB 754 from Herzog. Resin specimens are first finely mortared. The resulting powder is introduced into a brass cylinder with a base aperture (internal diameter at the top part of the cylinder 20 mm, diameter of the base aperture in the cylinder 16 mm, height of the cylinder 6 mm) and melted on a hotplate. The amount introduced is selected such that the resin after melting fully fills the cylinder without protruding.

The resulting sample body, complete with cylinder, is inserted into the sample mount of the HRB 754. Glycerol is used to fill the heating bath where the tackifier resin softening temperature is between 50° C. and 150° C. At lower tackifier softening temperatures, a water bath may also be operated. The test balls have a diameter of 9.5 mm and weigh 3.5 g. In line with the HRB 754 procedure, the ball is arranged above the sample body in the heating bath and is placed down on the sample body. Located 25 mm beneath the base of the cylinder is a collecting plate, which has a light barrier 2 mm above it. During the measuring procedure, the temperature is raised at 5° C./min. Within the temperature range of the tackifier resin softening temperature, the ball begins to move through the base aperture in the cylinder, until finally coming to rest on the collecting plate. In this position, it is detected by the light barrier, and at this point in time the temperature of the heating bath is recorded. A duplicate determination is conducted. The tackifier resin softening temperature is the average value from the two individual measurements.

Peel Adhesion

The peel adhesions on steel were determined in analogy to ISO 29862 (method 3) at 23° C. and 50% relative humidity at a peel rate of 300 mm/min and a peel angle of 180°. The reinforcing sheet used was an etched PET film with a thickness of 36 μm, as available from Coveme (Italy). The bonding of the measurement strip was performed using a roller machine applying 4 kg at a temperature of 23° C. The adhesive tapes were peeled off immediately after application. The measurement value (in N/cm) was obtained as average value from three individual measurements.

Bond Strength

Tensile Shear Test:

As a parameter of the quality of the bonding achieved, the bond strength was determined, for the various adhesive tapes, on a bond produced by the method of the invention. For this purpose, the bond strength was determined quantitatively in each case in a dynamic tensile shear test in accordance with DIN EN 1465 at 23° C. and 50% rh for a testing rate of 10 mm/min (results in $N/mm^2$=MPa). Test rods employed were of steel, cleaned with acetone prior to bonding. The layer thicknesses of the adhesive tapes corresponded in each case to the details above. The result reported is the average value from three measurements.

Short-Term Temperature Stability (STTS)

The SAFT test (Shear Adhesion Failure Temperature (SAFT)) serves for accelerated testing of the shear strength of adhesive tapes under temperature load. For the test, the adhesive tape under investigation is adhered to a heatable steel plate, the tape is loaded with a weight (50 g), and the distance of shear is recorded.

Sample Preparation

The adhesive tape under investigation is adhered to an aluminium foil 50 μm thick. The adhesive tape thus prepared is cut to a size of 10 mm×50 mm. The cut-to-size adhesive tape sample is bonded to a polished steel test plate (material 1.4301, DIN EN 10088-2, surface 2R, surface roughness Ra=30 to 60 nm, dimensions 50 mm×13 mm×1.5 mm), cleaned with acetone, in such a way that the bond area of the sample in terms of height×width=13 mm×10 mm and the steel test plate protrudes by 2 mm at the top edge. The bond is then fixed by rolling a 2 kg steel roller over it six times at a speed of 10 m/min. At the top the sample is reinforced flush with a stable adhesive strip which serves as a support for the travel sensor. Using the steel plate, the sample is then suspended such that the adhesive tape end with the longer overhang points vertically downwards.

Measurement

The sample for measurement is loaded at the bottom end with a 50 g weight. The steel test plate with the bonded sample is heated to the end temperature of 200° C., beginning at 30° C., at a rate of 9° C. per minute. The shear travel of the sample is observed by means of a travel sensor, as a function of temperature and time. The maximum shear travel is set at 2000 μm (2 mm); if exceeded, the test is discontinued. Test conditions: room temperature 23±3° C., relative humidity 50±5%.

The measurement value (in ° C.) is obtained as the average value from two individual measurements.

The STTS is defined as the temperature at which the shear travel reaches 1000 μm.

Viscosity Measurement

One measure of the fluidity of the fluid coating material is dynamic viscosity. The dynamic viscosity can be determined according to DIN 53019. "Fluid" refers to a viscosity of less than $10^8$ Pas. The viscosity is measured in a rotating-cylinder viscometer having a standard geometry in accordance with DIN 53019-1 at a measurement temperature of 23° C. and a shear rate of $1 \times s^{-1}$.

Raw Materials Used:

| | |
|---|---|
| Breon N41H80 | Nitrile-butadiene rubber with an acrylonitrile fraction of 41 wt % from Zeon Chemicals (London, UK) |
| Desmomelt 530 | Largely linear hydroxyl polyurethane. Desmomelt 530 is a highly crystalline, elastic polyurethane of very low thermoplasticity from Bayer MaterialScience. The enthalpy of fusion as measured by DSC is 54.7 J/g. |
| Araldite ECN 1299 | Solid epoxy-cresol novolak from Huntsman with a softening temperature (DIN519219) 85 to 100° C. |
| Polyacrylate 1 | Pressure-sensitively adhesive acrylate copolymer of 2-hydroxyethyl acrylate, 2 ethylhexyl acrylate and C-17 acrylate, $M_n$ = 884 000 g/mol |
| Polyurethane 1 | Thermoplastic polyurethane based on a prepolymer of polyadipate of 1,4-butanediol reacted with MDI. The enthalpy of fusion is 22.4 J/g. |
| Capa 2203A | Thermoplastic polycaprolactone polyol ($M_n$ ~2000 g/mol) from Perstorp. |
| Epikote 828 LVEL | Distilled difunctional bisphenol A/epichlorohydrin liquid epoxide having a weight per epoxide of 185 to 192 g/eq from Hexion. Viscosity at 25° C. of 10 to 12 Pa s. |
| Epon Resin 828 | Difunctional bisphenol A/epichlorohydrin liquid epoxide having a weight per epoxide of 185 to 192 g/eq from Momentive. Viscosity at 25° C. of 12 to 14 Pa s. |
| PolyDis PD3611 | Nitrile rubber-modified epoxy resin based on bisphenol F diglycidyl ether with an elastomer content of 40 wt % and a weight per epoxide of 550 g/eq from Schill + Seilacher "Struktol". Viscosity at 25° C. of 10 000 Pa s. |
| PolyDis PD3691 | Nitrile rubber-modified epoxy resin based on bisphenol A diglycidyl ether with an elastomer content of 5 wt % and a weight per epoxide of 205 g/eq from Schill + Seilacher "Struktol". Viscosity at 25° C. of 300 Pa s. |
| Tactix 556 | Dicyclopentadiene-epoxy-novolak resin having a weight per epoxide of 215 to 235 g/eq and a softening point of 53° C. from Huntsman. |
| Dyhard 100S | Latent curing agent from AlzChem for epoxide systems, consisting of micronized dicyandiamide wherein 98% of the particles are smaller than 10 μm. |
| Dyhard UR500 | Latent uron accelerator for epoxide systems, wherein 98% of the particles are smaller than 10 μm. |
| Triarylsulphonium hexafluoro-antimonate | Cationic photoinitiator from Sigma-Aldrich. The photoinitiator has an absorption maximum in the 320 nm to 360 nm range and took the form of a 50 wt % strength solution in propylene carbonate |

Polyacrylate 1 was prepared according to the following protocol:

A 2 L glass reactor conventional for radical polymerizations was charged with 40 g of 2-hydroxyethyl acrylate, 240 g of 2-ethylhexyl acrylate, 120 g of C17 acrylate (triply branched sides with $C_3$, $C_4$ chain segments, BASF SE), 133 g of special-boiling-point spirit 69/95 and 133 g of acetone. After nitrogen gas had been passed through the reaction solution with stirring for 45 minutes, the reactor was heated to 58° C. and 0.2 g of Vazo 67 (DuPont) was added. The external heating bath was then heated to 75° C. and the reaction was carried out constantly at this external temperature. After a reaction time of 1 hour, 50 g of toluene were added. After 2.5 hours, the batch was diluted with 100 g of acetone. After a reaction time of 4 hours, a further 0.2 g of Vazo 67 was added. After a polymerization time of 7 hours, dilution took place with 100 g of special-boiling-point spirit 60/95, and after 22 hours with 100 g of acetone. After a reaction time of 24 hours, the polymerization was discontinued and the reaction vessel was cooled to room temperature. The molecular weight $M_n$ was 884 000 g/mol.

Polyurethane 1 was prepared according to the following protocol:

First of all under inert gas a prepolymer was prepared from a 1,4-butanediol polyadipate (Hoopol F-530, $M_w$=2450 g/mol) with 1.25 equivalents of 4,4'-diphenylmethane diisocyanate (MDI, Aldrich, 98% 4,4' isomer). The polyurethane was likewise prepared under nitrogen atmosphere with a stoichiometric amount of 1,4-butanediol, with stirring for 2 hours. The enthalpy of fusion as measured by DSC is 22 J/g.

| | Example: | | | | | | | | |
|---|---|---|---|---|---|---|---|---|---|
| | K1 parts by wt. | K2 parts by wt. | K3 parts by wt. | K4 parts by wt. | K5 parts by wt. | K6 parts by wt. | K7 parts by wt. | K8 parts by wt. | K9 parts by wt. |
| Breon N41H80 | 20 | 20 | — | | | | | | |
| Desmomelt 530 | — | — | 20 | | 20 | 14.3 | 20 | 20 | |
| Polyacrylate 1 | | | | 20 | | | | | |
| Polyurethane 1 | | | | | | | | | 20 |
| Capa 2203A | | | | | | 4.8 | | | |
| Epon Resin 828 | 80 | — | — | | | | | | |
| Epikote 828 LVEL | | | | | | | 20 | | |
| Araldite ECN1299 | | | | | | | | 60 | |
| PolyDis PD3611 | — | 65 | — | 65 | 30 | | | | |

-continued

|  | Example: | | | | | | | | |
|---|---|---|---|---|---|---|---|---|---|
|  | K1 parts by wt. | K2 parts by wt. | K3 parts by wt. | K4 parts by wt. | K5 parts by wt. | K6 parts by wt. | K7 parts by wt. | K8 parts by wt. | K9 parts by wt. |
| PolyDis PD3691 | — | 15 | — | 15 | 10 |  |  |  |  |
| Tactix 556 | — | — | 80 | — | 40 | 76.2 |  | 80 | 80 |
| Dyhard 100S | 5.56 | 2.49 | 4.62 | 4.87 | 3.51 | 4.4 |  | 4.62 | 4.62 |
| Dyhard UR500 | 0.56 | 0.25 | 0.46 | 0.49 | 0.35 | 0.4 |  | 0.46 | 0.46 |
| Triarylsulphonium hexafluoro-antimonate |  |  |  |  |  |  | 0.8 |  |  |
| Desmodur N3300 |  |  |  |  |  | 4.38 |  |  |  |
| Coscat 83 |  |  |  |  |  | 0.04 |  |  |  |
| Aerosil R202 |  |  |  |  |  |  |  | 7 |  |

The pressure-sensitive adhesives were prepared in the laboratory by dissolving the at least one polymer in butanone at 23° C. Subsequently the reactive resin or resins was or were added. Thereafter the curing agent was added with strong shearing by means of stirring.

In order to produce layers of adhesive, the various adhesives were applied from a solution to a conventional liner (siliconized polyester film) by means of a laboratory coater, and were dried. The adhesive layer thickness after drying is 100±10 μm. Drying took place in each case first at RT for 10 minutes and at 105° C. for 10 minutes in a laboratory drying oven. The dried layers of adhesive were each immediately laminated on the open side after drying with a second liner (siliconized polyester film with relatively low release force).

K1-K6 are thermosetting adhesives. For curing, the test specimens were cured at 180° C. for 30 minutes.

K7 is a UV light-activatable adhesive, which is activated with UV light immediately prior to bonding (dose: >80 mJ/cm$^2$; lamp type: undoped mercury emitter). To accelerate the dark reaction, the bonded sample is heated at 80° C. for an hour.

K6 is an example of a pre-crosslinked adhesive having significantly improved adhesive properties in the uncured state. The preliminary crosslinking takes place in the tape over approximately 30 days at 23° C. and 50% rh.

Measurement Values:

| Example: | K1 | K2 | K3 | K4 | K5 | K6 | K7 | K8 | K9 |
|---|---|---|---|---|---|---|---|---|---|
| Peel adhesion, uncured (steel)/N cm$^{-1}$ | 5 | 8 | 20 | 2 | 9.4 | 11.4 | 9 | 13 | 6 |
| Dynamic shear test (steel-steel)/MPa | 13 | 12 | 28 | 18 | 31 | 20 | 7.3 | 26 | 24 |
| Dynamic shear test (oiled steel-oiled steel)/MPa | 11 | 11 | 4 | — | 28 | 2 | — | 3 | 5 |
| STTS/° C. | 30 | 57 | 56 | 38 | 53 | 178 | 43 | 98 | 30 |

* Oiling quantity 1 g/m$^2$ with Fuchs Anticorit PL3802-39S

A comparison of adhesives K1 with K2 and K3 shows that improved uncured adhesives are obtained if the epoxy resins used have high viscosities (>20 Pa s) (K2) or if solid epoxy resins are used (K3). Thus the STTS rises from 30° C. to 57° C. and 56° C., respectively.

The adhesives acquire their pressure-sensitive adhesive properties through the addition of suitable reactive resins. Where polymers are used that are already pressure-sensitively adhesive, and/or where polymer/tackifier resin mixtures are used, as is the case in K4, there is a deterioration in the cohesive properties in the uncured state. This is manifested in a low STTS of only 38° C.

For applications in the automotive body shell, the adhesive tapes are required to achieve high bond strengths on oily substrates. This is demonstrated outstandingly by K5.

Adhesives K1 to K5, K7 and K8 are cured at 180° C., for example. Before the crosslinking reaction starts, these adhesive tapes pass through a very low-viscosity phase, causing assemblies which are not additionally held (for example with clips, clinchers, soldered spots, welded spots) to fall apart again. This disadvantage can be removed if the adhesives undergo preliminary crosslinking after coating in the adhesive tape. This is realised by way of example in K6. The STTS is increased to 178° C., for a very high bond strength of 20 MPa.

The addition of rheology modifiers such as Aerosil R202, for example, likewise improves the STTS. This is shown by way of example in example K8, for which the STTS improves to 98° C.

When polyurethanes are used it has emerged that a high crystallinity fraction is advantageous for the pressure-sensitive adhesive properties. In comparison to K3 (enthalpy of fusion of 54.7 J/g), a less-crystalline polyurethane as used in K9 does not produce sufficiently cohesive adhesive tapes, as evident in the SAFT test. In that test, the adhesive tapes fail even at the starting temperature of 30° C.

As the peel adhesion measurement values show, all examples are pressure-sensitive adhesives having sufficient cohesion. The values are above 1 N/cm in the case of adhesive failure. The cohesion required for this purpose is attributed to the continuous polymer phase, which is evident under a scanning electron microscope (SEM).

Figure 1:
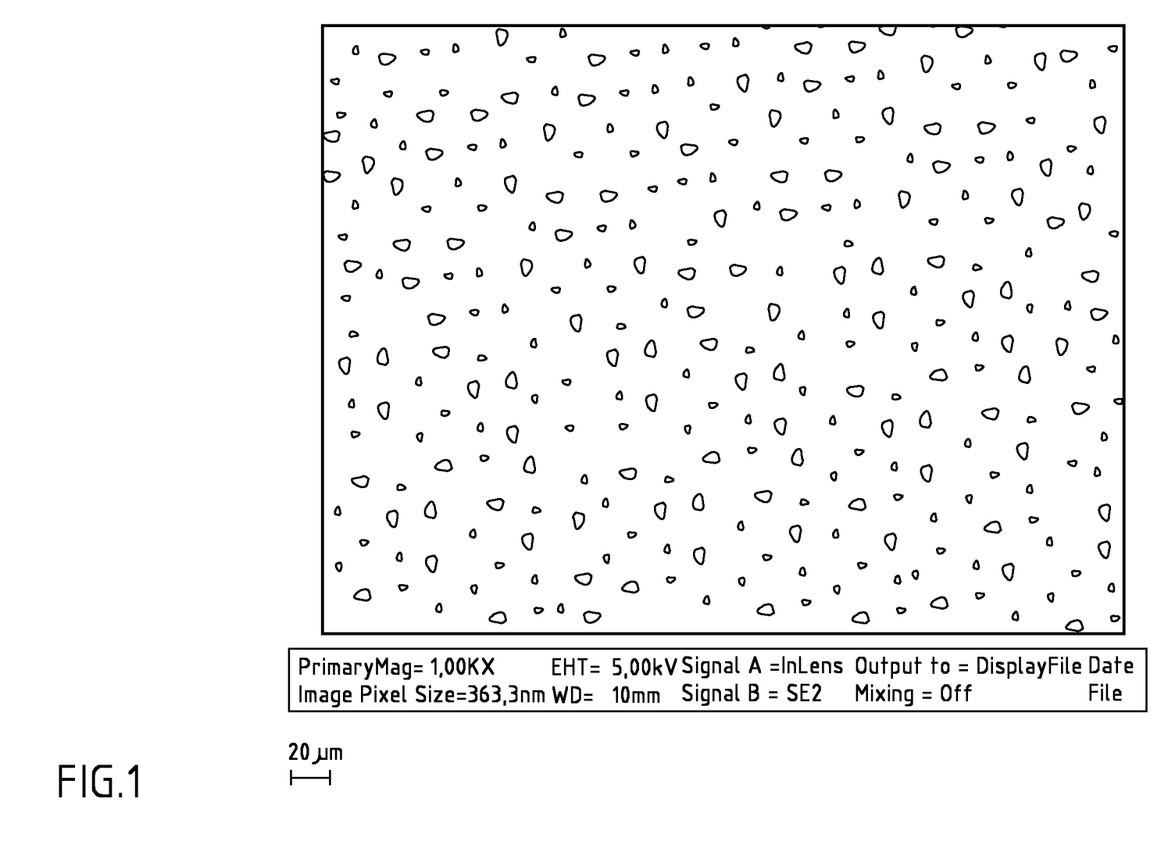
FIG. 1: is a micrograph of the adhesive of example K1 in the uncured state.

FIG. 1 shows a simplified drawing of a recording of the adhesive of example K1 in the uncured state. The nitrile-butadiene rubber has been stained with osmium tetroxide. A white-coloured continuous nitrile rubber phase is apparent. The second, non-rubber phase is represented by framed white particles. It is clear indirectly that this phase must be partly swollen with epoxide, since the fraction of the white-coloured phase is much greater than would be expected from the composition (20%).

Figure 2:
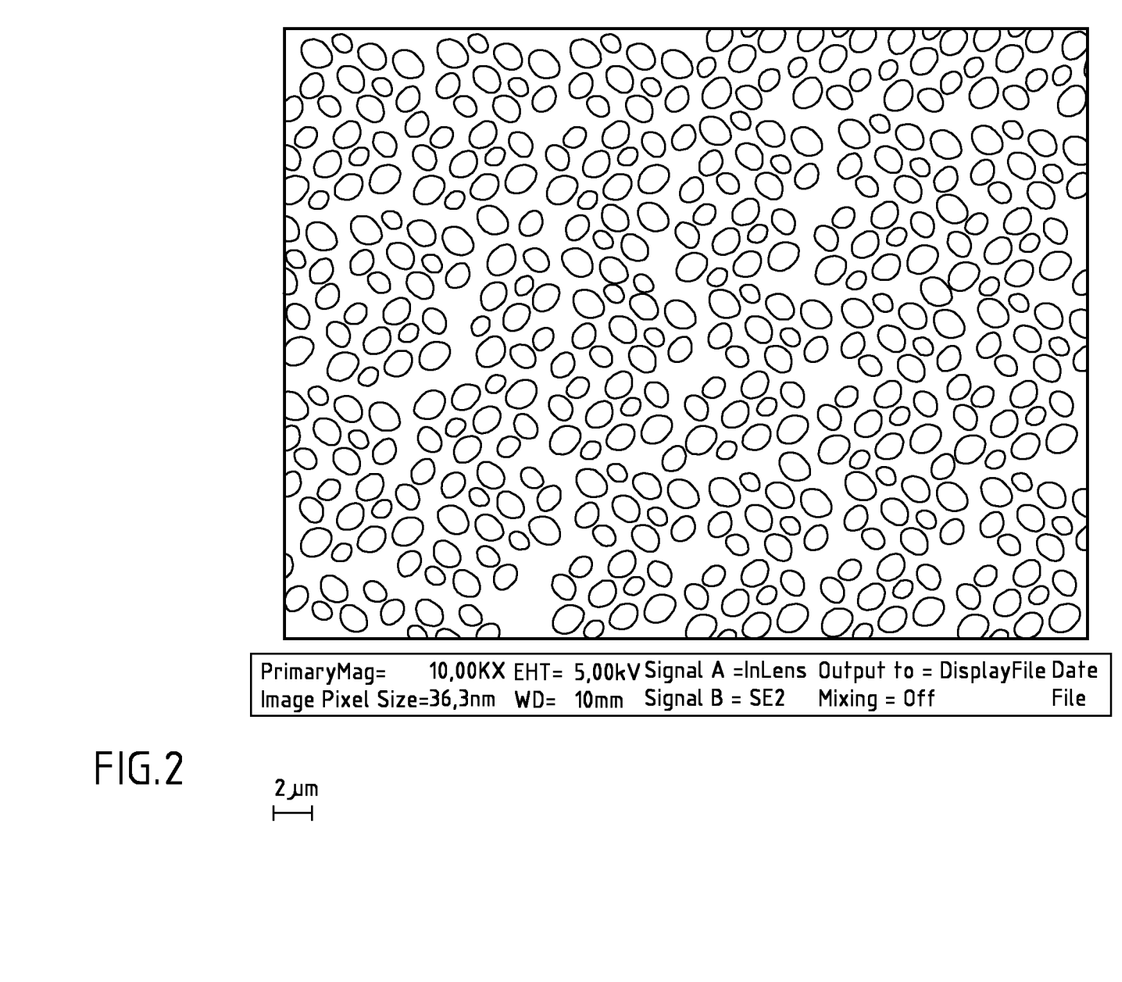
FIG. 2: is a micrograph of the adhesive of example K1 in the cured state (after 30 minutes of curing at 180° C.).

FIG. 2 shows a simplified drawing of a micrograph of the same adhesive after 30 minutes of curing at 180° C. The phase structure can be seen much more clearly in the cured state. It can likewise be seen that the polymer phase (white-colored continues to form the continuous phase. The high bond strength suggests that epoxide is in solution in the polymer phase as well and undergoes crosslinking with the epoxide of the dissolved epoxide phase (represented by framed particles).

Figure 3:
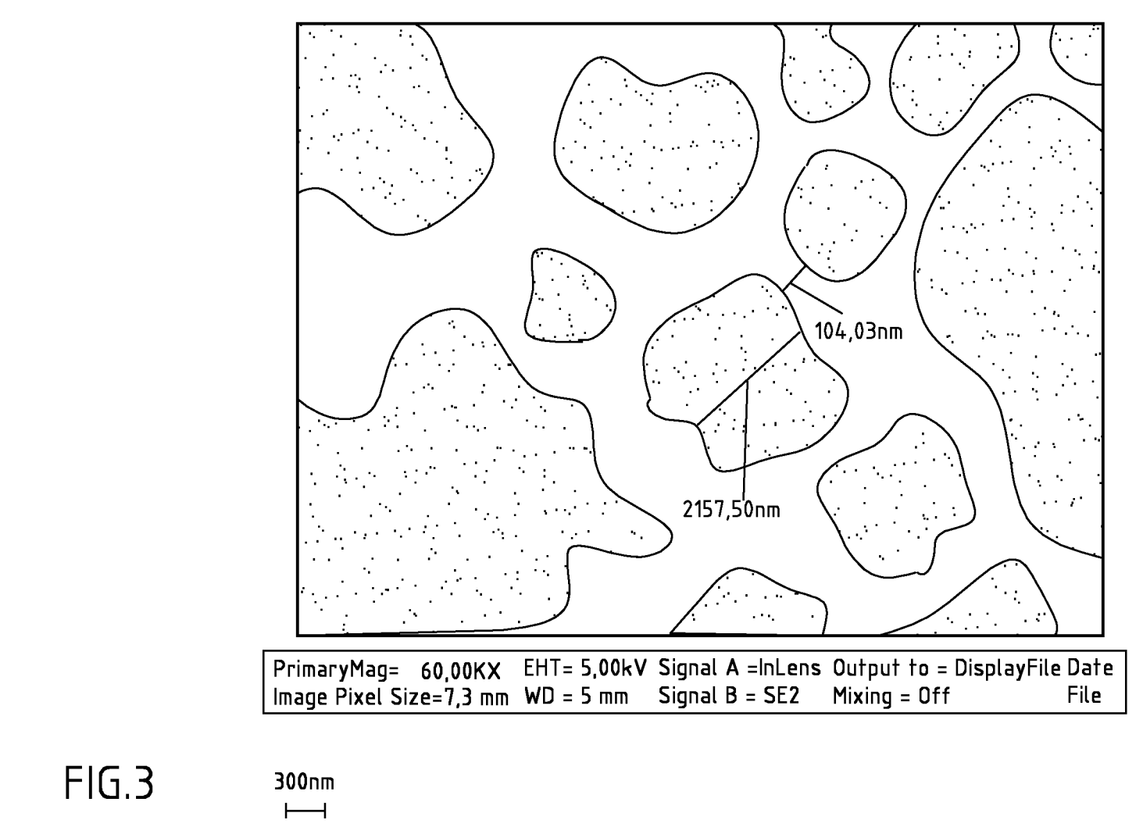
FIG. 3: is a micrograph of the adhesive of example K2 in the uncured state.

FIG. 3 shows a simplified drawing of a micrograph of the adhesive from example K2 in the uncured state. In this blend as well, the continuous NBR phase (white colored phase) can be made out. In contrast to the blend with pure epoxide, the disperse epoxide phases also exhibit lighter-coloured points, since the epoxide phase is composed of nitrile rubber-modified epoxides, which can likewise be stained.

Figure 4:
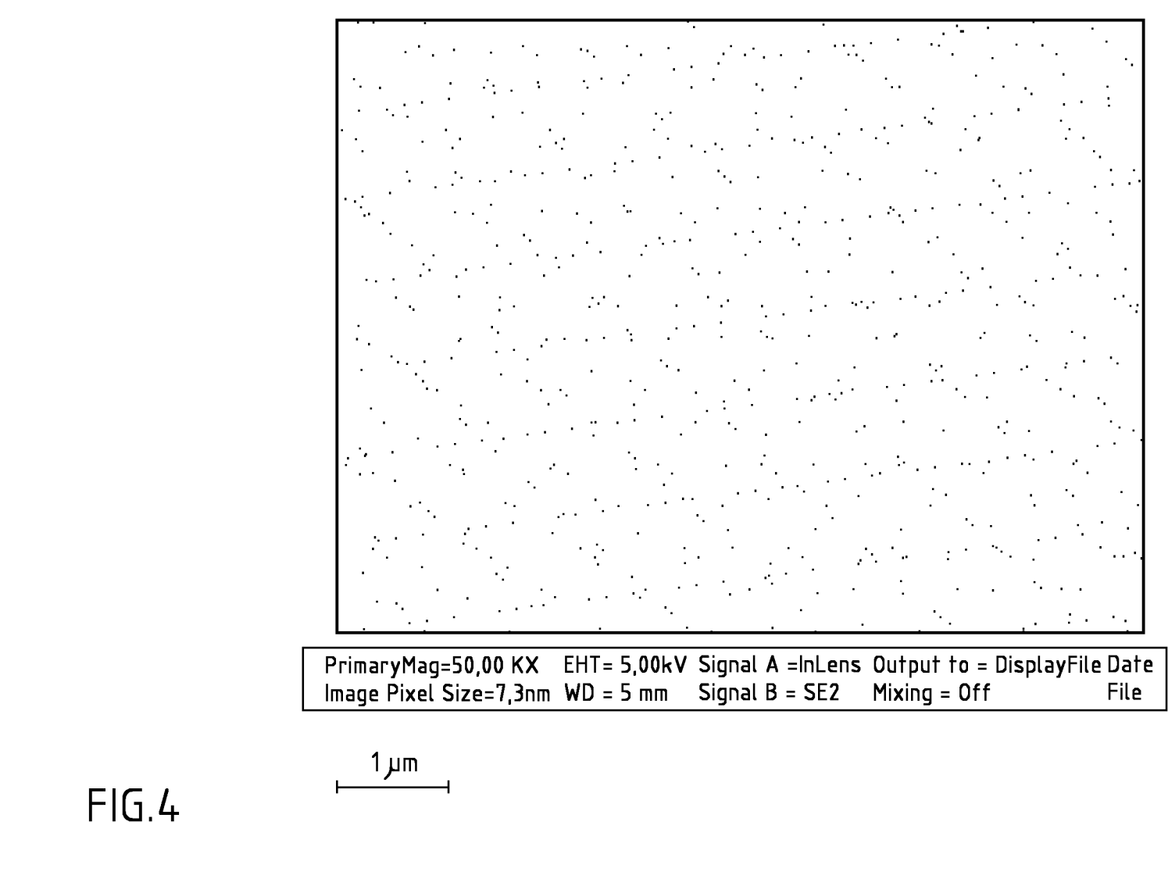
FIG. 4: is a micrograph of the adhesive of example K3 in the cured state.

FIG. 4 shows a simplified drawing of a micrograph of the adhesive from example K3 in the cured state. In this case there is no phase structure apparent. That fact, the high bond strengths in the uncured state, and at the same time the high bond strengths in the cured state suggest the conclusion that these systems possess a continuous polymer phase (on account of the high peel adhesions in the uncured state), in which the epoxide component is present in dissolved form (leading to high bond strengths in the cured state).

The invention claimed is:

1. Adhesive tape containing an adhesive comprising
at least one polymer selected from the group consisting of acrylonitrile-butadiene rubbers, poly(ethylene oxide), poly(ethylene terephthalate), poly(carbonates), poly(phenylene oxides), poly(urethanes), poly(ureas), poly(amides) (PA), poly(lactate) (PLA), poly(etheretherketone) (PEEK), poly(sulphone) (PSU) and poly(ethersulphone) (PES)
optionally a tackifier resin
at least one epoxy resin, the adhesive comprising at least 104 parts of the at least one epoxy resin per 100 parts of polymer and tackifier resin
at least one initiator and/or curing agent and/or accelerator
wherein said at least one polymer is per se not pressure-sensitively adhesive, but the adhesive is a pressure sensitive adhesive, the at least one polymer being present as continuous polymer phase in the uncured state of the pressure sensitive adhesive, and the at least one epoxy resin
is a solid having a softening temperature of at least 45° C., or
has a viscosity at 25° C. of at least 20 Pa s.

2. Adhesive tape according to claim 1, wherein the adhesive comprises at least 120 parts of reactive resin per 100 parts of polymer.

3. Adhesive tape according to claim 1, wherein at least one epoxy resin is present as reactive resin.

4. Adhesive tape according to claim 3, wherein said at least one epoxy resin is based on bisphenol A, bisphenol S, bisphenol F, an epoxy novolak, an epoxy-cresol novolak or an epoxidized nitrile rubber.

5. Adhesive tape according to claim 1, wherein the at least one polymer is an elastomer or a thermoplastic.

6. Adhesive tape according to claim 1, wherein the at least one epoxy resin is present at least partly in homogeneous solution in the continuous polymer phase.

7. Adhesive tape according to claim 1, wherein said at least one polymer is selected from the group consisting of polyurethanes, nitrile-butadiene rubbers, polyamides, poly(etheretherketone) (PEEK), poly(sulphone) (PSU), and poly(ethersulphone) (PES).

8. Adhesive tape according to claim 1, wherein the short-term temperature resistance of the uncured adhesive tape is greater than 35° C.

9. Adhesive tape according to claim 3, wherein at least one of the at least one epoxy resin has on average more than two epoxide groups per molecule.

10. Adhesive tape according to claim 1, wherein the peel adhesion of the uncured pressure sensitive adhesive on steel is at least 1 N/cm.

11. Adhesive tape according to claim 1, wherein the bond strength, measured by dynamic shearing test, on steel is at least 5 MPa.

12. Adhesive tape according to claim 1, wherein said at least one polymer is a polyurethane, and wherein the polyurethane is semicrystalline and in the DSC measurement has a melting peak or crystallization peak which corresponds to an enthalpy of fusion of at least 5 J/g.

13. Adhesive tape according to claim 1, wherein the at least one polymer is chemically crosslinked after coating and before use.

14. Adhesive tape according to claim 13, wherein the chemical crosslinking takes place with radiation induction or via the addition of a crosslinking agent, optionally with addition of a polyfunctional alcohol or amine having a molar weight <10 000 g/mol.

15. Adhesive tape according to claim 1, present without carrier as an adhesive transfer tape.

16. A method for the permanent joining of two substrates, wherein said two substrates are joined by an adhesive tape of claim 1.

17. Method for the adhesive bonding of oiled substrates, wherein said oiled substrates are bonded with an adhesive tape of claim 1.

18. Method for producing a solvent-based pressure sensitive adhesive tape of claim 17, wherein the adhesive of the tape is produced by a process comprising the steps of:
dissolving the at least one polymer in a non-aqueous solvent;
adding the at least one reactive resin;
cooling to room temperature;
adding the curing agent and optionally the accelerator with shearing, in order to achieve effective dispersing;
adding optional additives, rheology modifiers, foaming agents, fillers, adhesion promoters.

19. Method for producing a solvent-free pressure sensitive adhesive tape of claim 1, wherein the adhesive of the tape is produced by a process comprising the steps of
melting the at least one polymer;
metering in the at least one reactive resin;
cooling the melt to below 100° C.;
metering in and mixing in the curing agent and optionally the accelerator;
extruding thin layers with a thickness of 50 μm to 3000 μm.

* * * * *